United States Patent [19]

Weremijenko

[11] 4,161,055

[45] Jul. 17, 1979

[54] METHOD OF MAKING SELF ALIGNING SPHERICAL BEARING

[75] Inventor: Mykola Weremijenko, Yardley, Pa.

[73] Assignee: Roller Bearing Company of America, West Trenton, N.J.

[21] Appl. No.: 906,474

[22] Filed: May 17, 1978

[51] Int. Cl.² ............................................. B21D 53/10
[52] U.S. Cl. ................................. 29/149.5 B; 308/72; 228/2; 228/115
[58] Field of Search .................. 29/149.5 C, 148.4 C, 29/149.5 B; 308/72; 228/2, 115

[56] References Cited

U.S. PATENT DOCUMENTS

| Re. 27,778 | 10/1973 | Potter et al. | 29/149.5 B |
| 3,583,775 | 6/1971 | Potter et al. | 308/72 |
| 3,695,650 | 10/1972 | Stuck | 308/72 |
| 3,695,651 | 10/1972 | Stuck | 29/149.5 B |
| 4,033,019 | 7/1977 | Orkin | 308/72 |

FOREIGN PATENT DOCUMENTS 4633643 7/1968 Japan ................................. 29/149.5 C

*Primary Examiner*—Charlie T. Moon
*Assistant Examiner*—V. K. Rising
*Attorney, Agent, or Firm*—Zachary T. Wobensmith, 2nd; Zachary T. Wobensmith, III

[57] ABSTRACT

A method of making a self aligning spherical bearing from three parts, a spherical inner race and two outer race components, the method comprising holding one outer race component, positioning and holding the spherical inner race therein, positioning the other outer race component in alignment therewith and friction welding the two outer race components together until the meeting faces of the two outer race components are in contact to provide a controlled clearance between the inner and outer races.

4 Claims, 4 Drawing Figures

METHOD OF MAKING SELF ALIGNING SPHERICAL BEARING

BACKGROUND OF THE INVENTION

1. Field of the Invention

This invention relates to a method of making a self aligning spherical bearing wherein the outer race of the bearing comprises two race components friction welded together.

2. Description of the Prior Art

It is common practice to utilize some form of friction welding to join two pieces of material together and such welding has been used in the assembly of various types of ball joints and bearings.

One method of friction welding ball joints is shown in the patent to Stuck, U.S. Pat. No. 3,801,395, which includes a ball element surrounded by a pair of ball cups of plastic material which are friction welded along the equator of the ball element and have a sleeve surrounding the ball cups.

Another method of making a spherical bearing is shown in the U.S. Patent to H. L. Potter et al., U.S. Pat. No. Re. 27,778 which includes an insert bushing integrated into a socket structure, by a bushing with a truncated bearing ball nested by the inner bearing surface, which is friction welded around the outer periphery of the bushing to a housing to form an integral load carrying part thereof.

Another method of assembling bearings is shown in the U.S. patent to Orkin, U.S. Pat. No. 4,033,019, wherein a self aligning spherical bearing is formed by placing the mating surfaces of two ring members, each having annular bearing recesses, together about the spherical member, directing an energized beam, raised inwardly, towards the common axis of the ring members to fusion bond the mating surface of the ring members together, and then injecting a mixture of an acrylate composition and a solid particulate lubricant between the spherical bearing surface and the inner annular surfaces of the ring members to form a bearing surface thereon.

None of the prior art structures provide the simple method of my invention for making a self aligning spherical bearing by friction welding two outer race elements together with an inner race retained therebetween.

SUMMARY OF THE INVENTION

The present invention comprises a method of making a self aligning spherical bearing by holding one outer race component of the bearing, positioning and holding a spherical inner race, positioning an other outer race component in alignment therewith and friction welding the two outer race components until their meeting faces contact to obtain a controlled clearance therebetween.

The principal object of the invention is to provide a method of making a self aligning spherical bearing which is simple and inexpensive to make and provides a precision structure.

A further object of the invention is to provide a method of making a self aligning spherical bearing which can be used with a variety of sizes of bushings.

A further object of the invention is to provide a method of making a self aligning spherical bearing which is easily accomplished on simple equipment.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Figure 1:
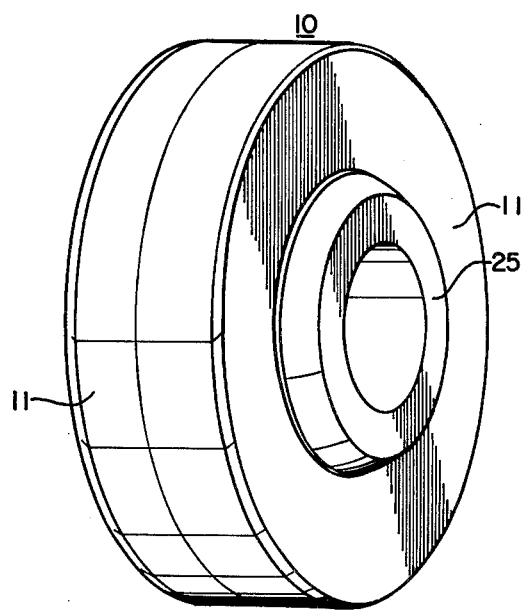
FIG. 1 is a view in perspective of a bearing made in accordance with the method of the invention.

Referring now more particularly to the drawings and FIGS. 1 and 5 thereof, a self aligning spherical bearing 10 made in accordance with the method of my invention is illustrated therein.

Figure 2:
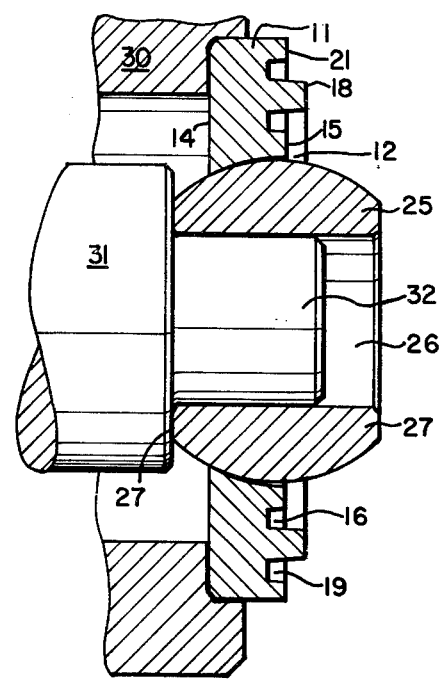
FIG. 2 is a central view in partial section showing the first step of the method of the invention.
Figure 3:
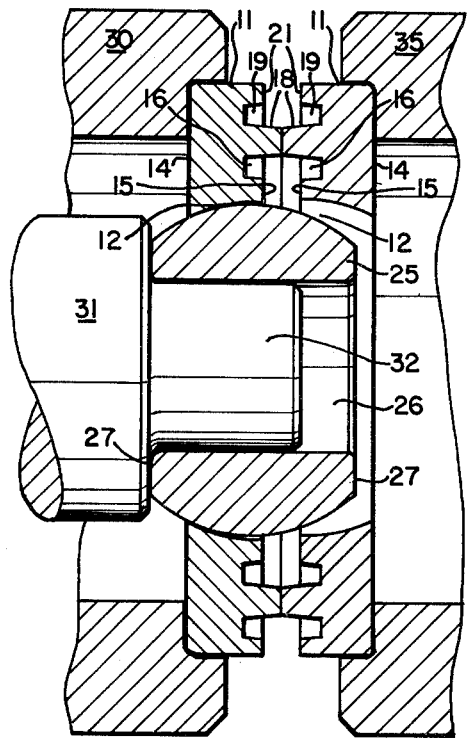
FIG. 3 is a view similar to FIG. 2 showing the next step in the method.
Figure 4:
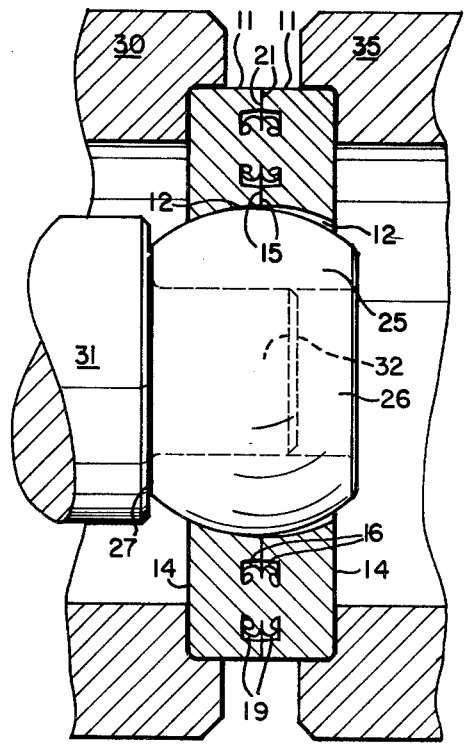
FIG. 4 is a view similar to FIG. 3 showing the final step in the method of the invention.

The bearing 10 includes two outer race components 11 of circular configuration each with a central opening 12 which is spherically tapered from a flat rear surface 14 to a flat inner face 15. As shown in FIGS. 2 and 3 the faces 15 each has a flash cavity 16 adjacent thereto extending around the periphery of the race components 11 with peripheral raised ribs 18 adjacent to the cavities 16.

Second flash cavities 19 are provided adjacent ribs 18 on the race components 11 also extending around the peripheries of the race components 11, with flat outer faces 21 adjacent thereto at the outermost peripheries of the race compenents 11. The race components 11 can be fabricated of any desired material, but preferably of case hardened steel, through hardened steel or unhardened steel.

The inner race 25 as illustrated has a spherical outside surface with a central bore or opening 26 with opposite flat faces 27 at each end of the bore 26. The outside diameter of the inner race 25 is of the same configuration as that described for the openings 12 in the outer face components 11.

The method of assembling the bearing 10 consists of positioning an outer race component 11 with face 14 thereagainst in a fixture 30 of well known type which retains it from rotation. An inner race 25 is placed over a holding fixture 31 with shaft 32 extending into the bore 26 and in the opening 12 of outer race component 11.

A second outer race component 11 is placed in a holding fixture 35 with its rib 18 against the rib 18 of the first race component 11. The second outer race component 11 is then rotated and forced against the first outer race component 11 to cause the ribs 18 to fuse with the excess weld material flashed into the cavities 16 and 19. The rotation of the second race component 11 is stopped before the fusion welding is complete and the axial pressure is continued until the flat faces 15 and 21 contact, when the axial pressure is terminated thereby providing a controlled clearance between the two race components 11. The finished bearing 10 can then be removed from the fixtures 30 and 35 for use.

It will thus be seen that a method of making a self-aligning spherical bearing has been provided in accordance with the objects of the invention.

I claim:

1. A method of making a self aligning spherical bearing comprising the steps of placing an outer bearing race component in a holding fixture, placing an inner spherical bearing race in a holding fixture adjacent said outer bearing race component, placing a second outer bearing race component in a rotatable bearing fixture in contact with said outer bearing race component, rotating said second outer bearing race component relative to said first bearing race component while applying axial pressure thereto for fusion welding, directing the flash weld material into a space in at least one of said outer bearing race components, stopping rotation of said second outer bearing race component at a predetermined axial location, applying axial pressure on said second outer bearing race component until stop faces on said outer bearing race components are in contact and removing the completed bearing from said holding fixture.

2. The method defined in claim 1 in which
the flash weld material is directed into a plurality of spaces in at least one of said outer bearing race components.

3. The method defined in claim 1 in which
the flash material is directed into a plurality of spaces in each of said outer bearing race components.

4. The method defined in claim 1 in which
said outer race components each have a plurality of stop faces which are brought into contact by said axial pressure application.

* * * * *